United States Patent
Curi

(10) Patent No.: US 6,663,494 B2
(45) Date of Patent: Dec. 16, 2003

(54) CONSTANT VELOCITY JOINT, GREASE COVER AND FLANGE ASSEMBLY

(75) Inventor: Jason Curi, Auburn Hills, MI (US)

(73) Assignee: GKN Automotive, Inc., Auburn Hills, MI (US)

( * ) Notice: Subject to any disclaimer, the term of this patent is extended or adjusted under 35 U.S.C. 154(b) by 71 days.

(21) Appl. No.: 10/141,230

(22) Filed: May 8, 2002

(65) Prior Publication Data

US 2003/0211895 A1 Nov. 13, 2003

(51) Int. Cl.[7] .................................................. F16C 1/26
(52) U.S. Cl. ........................ 464/170; 464/904; 464/905; 464/906; 464/15; 403/13
(58) Field of Search .................................. 464/904, 905, 464/906, 170, 15; 403/13, 14

(56) References Cited

U.S. PATENT DOCUMENTS 4,432,740 A * 2/1984 Petiot .......................... 464/906
5,318,480 A * 6/1994 Essi et al. .................... 464/175
5,676,599 A * 10/1997 Ricks et al. ................. 464/170
6,579,187 B2 * 6/2003 Ramey ......................... 464/15

FOREIGN PATENT DOCUMENTS

JP    11-189054    * 7/1999

* cited by examiner

Primary Examiner—Gregory J. Binda
Assistant Examiner—Aaron Dunwoody
(74) Attorney, Agent, or Firm—Mick A. Nylander

(57) ABSTRACT

An improved constant velocity joint grease cover and flange assembly and method of making the same. The constant joint has a mating surface with a first anti-slip portion. The flange has a mating surface with a second anti-slip portion, the grease cover has a first mating surface with a third anti-slip portion adapted to receive and mate with the first anti-slip portion of the constant velocity joint, and a second mating surface with a fourth anti-slip portion adapted to receive and mate with the second anti-slip portion of the flange. The respective anti-slip portions functions to reduce shearing forces on connecting bolts of the assembly caused by applied torque.

16 Claims, 8 Drawing Sheets

```
┌─────────────────────────────────────┐
│  Providing a constant velocity joint having  │
│  a first mating surface with a first          │── 40
│  anti-slip portion.                           │
└─────────────────────────────────────┘
                    │
                    ▼
┌─────────────────────────────────────┐
│  Providing a flange having a mating           │
│  surface and a second anti-slip portion.      │── 42
└─────────────────────────────────────┘
                    │
                    ▼
┌─────────────────────────────────────┐
│  Providing a grease cover having a first      │
│  mating surface with a third anti-slip portion│
│  adapted to receive and mate with the first   │── 44
│  anti-slip portion of the constant velocity   │
│  joint and a second mating surface having     │
│  a fourth anti-slip portion adapted to receive│
│  and mate with the second anti-slip portion   │
│  of the flange.                               │
└─────────────────────────────────────┘
```

*Figure - 11*

CONSTANT VELOCITY JOINT, GREASE COVER AND FLANGE ASSEMBLY

TECHNICAL FIELD

The present invention relates to an improved interface for a constant velocity joint, grease cover and flange assembly to reduce shearing forces caused by applied torque.

BACKGROUND ART

There are generally four (4) main types of automotive drive line systems. More specifically, there exists a full-time front wheel drive system, a full-time rear wheel drive system, a part-time four wheel drive system, and an all-wheel drive system. Most commonly, the systems are distinguished by the delivery of power to different combinations of drive wheels, i.e., front drive wheels, rear drive wheels or some combination thereof. In addition to delivering power to a particular combination of drive wheels, most drive systems permit the respectively driven wheels to rotate at different speeds. For example, the outside wheels must rotate faster than the inside drive wheels, and the front drive wheels must normally rotate faster than the rear wheels.

Drive line systems also include one or more Cardan (Universal) and Constant Velocity joints (CVJ's). Cardan joints are the most basic and common joint type used, for example, on propshafts. Although highly durable, Cardan joints are typically not suited for applications with high angles (e.g.>2 degrees) because of their inability to accommodate constant velocity rotary motion. Constant Velocity joints, in contrast, are well known in the art and are employed where transmission of a constant velocity rotary motion is desired or required. For example, a tripod joint is characterized by a bell-shaped outer race (housing) disposed around an inner spider joint which travels in channels formed in the outer race. The spider-shaped cross section of the inner joint is descriptive of the three equispaced arms extending therefrom which travel in the tracks of the outer joint. Part spherical rollers are featured on each arm.

One type of constant velocity universal joint is the plunging tripod type, characterized by the performance of end motion in the joint. Plunging tripod joints are currently the most widely used inboard (transmission side) joint in front wheel drive vehicles, and particularly in the propeller shafts found in rear wheel drive, all-wheel drive and 4-wheel drive vehicles. A common feature of tripod universal joints is their plunging or end motion character. Plunging tripod universal joints allow the interconnection shafts to change length during operation without the use of splines which provoke significant reaction forces thereby resulting in a source of vibration and noise.

The plunging tripod joint accommodates end wise movement within the joint itself with a minimum of frictional resistance, since the part-spherical rollers are themselves supported on the arms by needle roller bearings. In a standard ball roller type constant velocity joint the intermediate member of the joint (like the ball cage in a rzeppa constant velocity joint) is constrained to always lie in a plane which bisects the angle between the driving and driven shafts. Since the tripod type joint does not have such an intermediate member, the medium plane always lies perpendicular to the axis of the drive shaft.

Another common type of constant velocity universal joint is the plunging VL or "cross groove" type, which consists of an outer and inner race drivably connected through balls located in circumferentially spaced straight or helical grooves alternately inclined relative to a rotational axis. The balls are positioned in a constant velocity plane by an intersecting groove relationship and maintained in this plane by a cage located between the two races. The joint permits axial movement since the cage is not positionably engaged to either race. As those skilled in the art will recognize, the principal advantage of this type of joint is its ability to transmit constant velocity and simultaneously accommodate axial motion. Plunging VL constant velocity universal joints are currently used for high speed applications such as, for example, the propeller shafts found in rear wheel drive, all-wheel drive and 4-wheel drive vehicles.

The high speed fixed joint (HSFJ) is another type of constant velocity joint well known in the art and used where transmission of high speed is required. High speed fixed joints allow articulation to an angle (no plunge) but can accommodate much higher angles than with a Cardan joint or other non-CV joints such as, for example, rubber couplings. There are generally three types of high speed fixed joints: (1) disk style that bolts to flanges; (2) monoblock style that is affixed to the tube as a center joint in multi-piece propshafts; and (3) plug-on monoblock that interfaces directly to the axle or T-case replacing the flange and bolts.

A HSFJ generally comprises: (1) an outer joint member of generally hollow configuration, having a rotational axis and in its interior, a plurality of arcuate tracks circumferentially spaced about the axis extending in meridian planes relative to the axis, and forming lands between the tracks and integral with the outer joint part wherein the lands have radially inwardly directed surfaces; (2) an inner joint member disposed within the outer joint member and having a rotational axis, the inner joint member having on its exterior a plurality of tracks whose centerline lie in meridian planes with respect to the rotational axis of the inner joint member in which face the tracks of the outer joint member and opposed pairs, wherein lands are defined between the tracks on the inner joint member and have radially outwardly directed surfaces; (3) a plurality of balls disposed one in each pair of facing tracks in the outer and inner joint members for torque transmission between the members; and (4) a cage of annular configuration disposed between the joint members and having openings in which respective balls are received and contained so that their centers lie in a common plane, wherein the cage has external and internal surfaces each of which cooperate with the land surfaces of the outer joint member and inner joint member, respectively to locate the cage and the inner joint member axially.

In joints of this kind, the configuration of the tracks in the inner and outer joint members, and/or the internal and external surfaces of the cage are such that, when the joint is articulated, the common plane containing the centers of the balls substantially bisects the angle between the rotational axis of the joint members. As indicated above, there are several types of high speed fixed joints differing from one another with respect to the arrangement and configuration of the tracks in the joint members and/or to the internal and external surfaces of the cage whereby the common bisector plane is guided as described above thereby giving the joint constant-velocity-ratio operating characteristics. In each design, however, the cage is located axially in the joint by cooperation between the external cage surface and the surfaces of the lands facing the cages surface.

The outer surface of the cage and cooperating land surfaces of the outer joint member are generally spherical. When torque is transmitted by the joint, the forces acting in the joint cause the cage to be urged (by e.g. ball expulsion forces) towards one end of the joint which end will depend on the respective directions of the offsets of the tracks in the inner and outer joint members from the common plane when the joint is in its unarticulated position. To reduce the normal forces acting on the cage as a result of these ball expulsion forces, the amount of spherical wrap by the outer joint member lands is maximized for increased cage support.

In a disc-style constant velocity fixed joint, the outer joint member is open on both ends and the cage is assembled from the end opposite the end towards which the cage is urged by the ball expulsion forces under articulated load conditions. Assembly of the cage into the outer joint member is typically accomplished by either incorporating cage assembly notches into one of or a pair of lands in the outer joint member, or by sufficiently increasing the bore diameter of the outer joint part to allow the ball cage to be introduced into the outer joint part.

In a mono-block constant velocity fixed joint, also called a "mono-block high speed fixed joint", the outer joint part is a bell-shaped member having a closed end. Accordingly, the cage must be assembled from the open end of the outer joint member. To accommodate assembly of the cage into the outer joint part, the bore diameter of the outer joint part must be sufficiently increased to allow assembly and/or assembly notches must be incorporated into at least one opposing pair of the outer joint member lands to allow introduction of the cage. typical driveline system incorporates one or more of the above joints to connect a pair of propeller shafts (front and rear) to a power take off unit and a rear driveline module, respectively. These propeller shafts ("propshafts") function to transfer torque to the rear axle in rear wheel and all wheel drive vehicles.

Most constant velocity universal joints are sealed in order to retain grease inside the joint while keeping contaminants and foreign matter, such as dirt, water, and the like out of the joint. In order to achieve this protection, the constant velocity joint is usually enclosed at the open end of the outer race by a sealing boot made of rubber, thermoplastic or urethane. The opposite end of the outer race is sometimes formed by an enclosed "dome" known in the art as the greasecap. In addition to retaining grease and protecting the joint from contaminants, the sealing boot functions to remain durable throughout millions of propeller shaft articulation revolutions while operating continuously within predetermined temperature ranges (typically –40C to 120C) at speeds up to 6000 revolutions per minute. Specifically, a constant velocity joint is affixed to a grease cover which, in turn, is affixed to a mating flange of a propeller shaft. The constant velocity joint, grease cover and flange assembly is typically held together by a plurality of bolts.

It has been found, however, that over time when torque is applied to the propeller shaft, resulting shearing forces may cause the connecting bolts to loosen and, in extreme cases, to become partly disengaged.

Consequently, a need exists for a constant velocity joint, grease cover and mating flange assembly having an improved interface to reduce if not eliminate the above shearing forces and resultant effects on the connecting bolts.

DISCLOSURE OF INVENTION

It is a principal object of the present invention to provide a constant velocity joint, grease cap and mating flange assembly having an improved interface.

In carrying out the above object, there is provided an improved constant velocity joint, grease cover and flange assembly. The constant velocity joint has a mating surface with a first anti-slip portion. Similarly, the flange has a mating surface with a second anti-slip portion. Still further, the grease cover has a first mating surface with a third anti-slip portion adapted to receive and mate with the first anti-slip portion of the constant velocity joint, and a second mating surface with a fourth anti-slip portion adapted to receive and mate with the second anti-slip portion of the flange. According to the invention, the respective anti-slip portions function to reduce shearing forces on connecting bolts of the assembly caused by applied torque.

To achieve the above described reduced shearing forces, there is further disclosed a method of providing an improved constant velocity joint, grease cap and flange interface. The method comprises providing a constant velocity joint having a first mating surface with a first anti-slip portion. The method further comprises providing a flange having a mating surface and a second anti-slip portion. Finally, the method comprises providing a grease cover having a first mating surface with a third anti-slip portion adapted to receive and mate with the first anti-slip portion of the constant velocity joint, and a second mating surface having a fourth anti-slip portion adapted to receive and mate with the second anti-slip portion of the flange.

In a preferred embodiment of both the assembly and method described herein, the third and fourth anti-slip portions comprise a plurality of circumferentially distributed dimples extending radially from opposing surfaces of the grease cover. Still further, in this preferred embodiment, the first and second anti-slip portions of the constant velocity joint and flange respectively comprise a plurality of circumferentially distributed recesses adapted to receive and mate with the dimples of the grease cap. In alternative embodiments, dimples may be replaced with recesses and vice versa. Still further, dimples and recesses may be combined on the same surfaces provided that corresponding changes are made to the mating portion. i.e. dimples mate with recesses.

The above object and other objects, features, and advantages of the present invention will become more readily apparent from the following detailed description of the best modes for carrying out the invention when taken in conjunction with the accompanying drawings.

BRIEF DESCRIPTION OF DRAWINGS

FIG. 11 is a block diagram illustrating the method steps of the present invention.

BEST MODE FOR CARRYING OUT THE INVENTION

Figure 1:
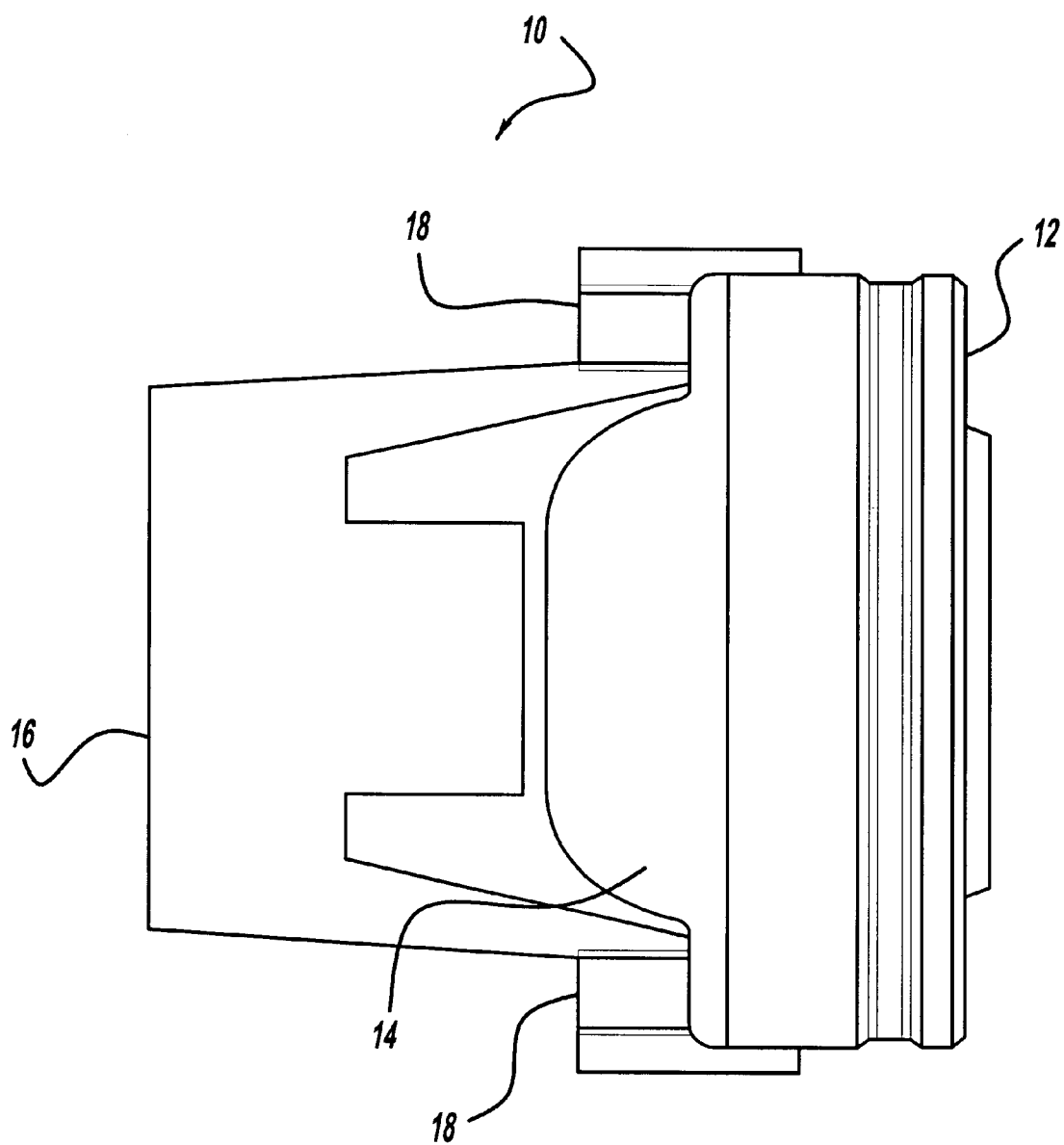
FIG. 1 is a side elevational view of prior art constant velocity joint, grease cap and flange interface.
Figure 2:
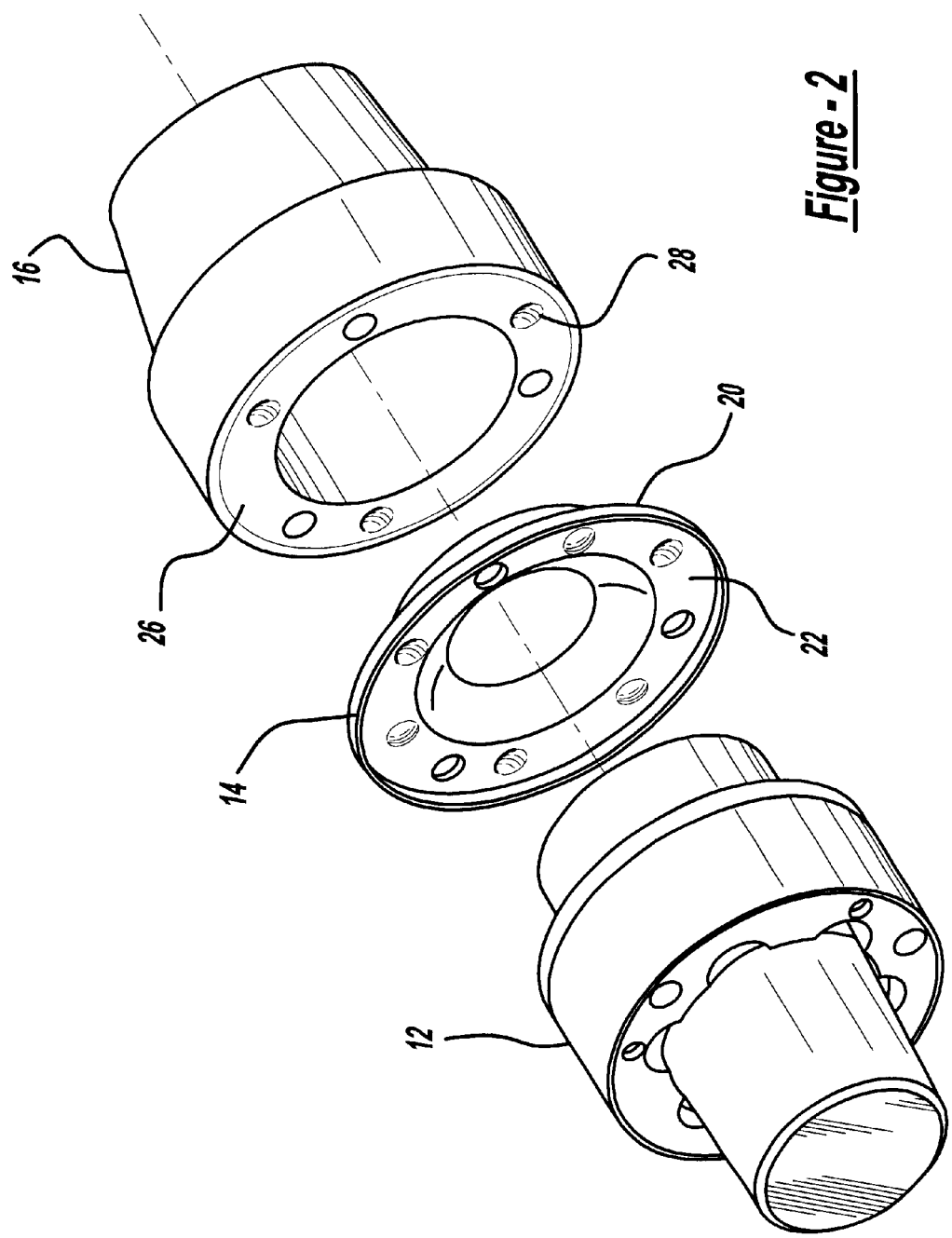
FIG. 2 is an exploded perspective view of the improved constant velocity joint, grease cover and flange assembly of the present invention.
Figure 3:
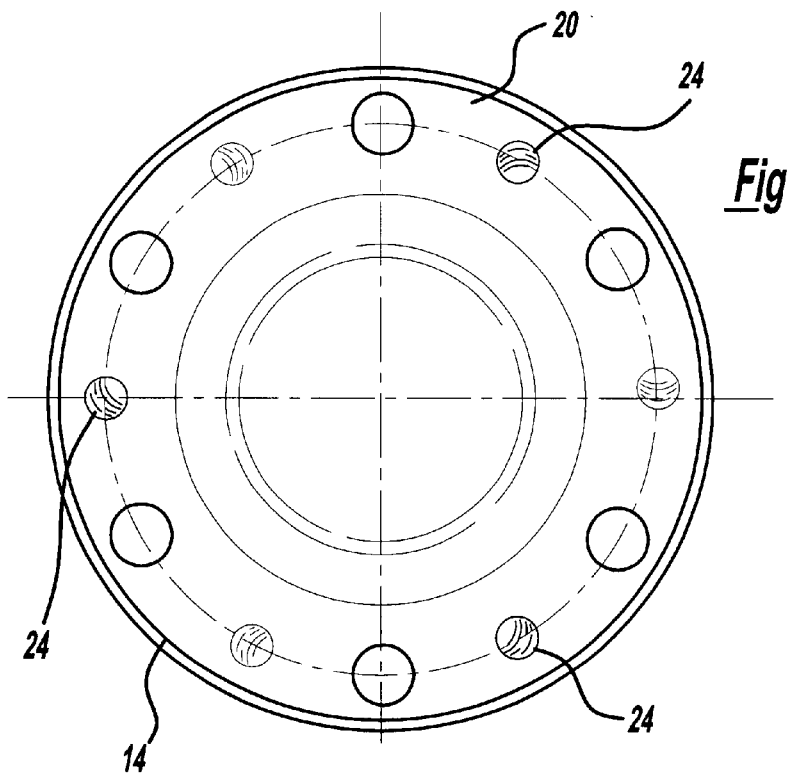
FIG. 3 is a top plan view of the improved grease cap of the present invention.
Figure 4:
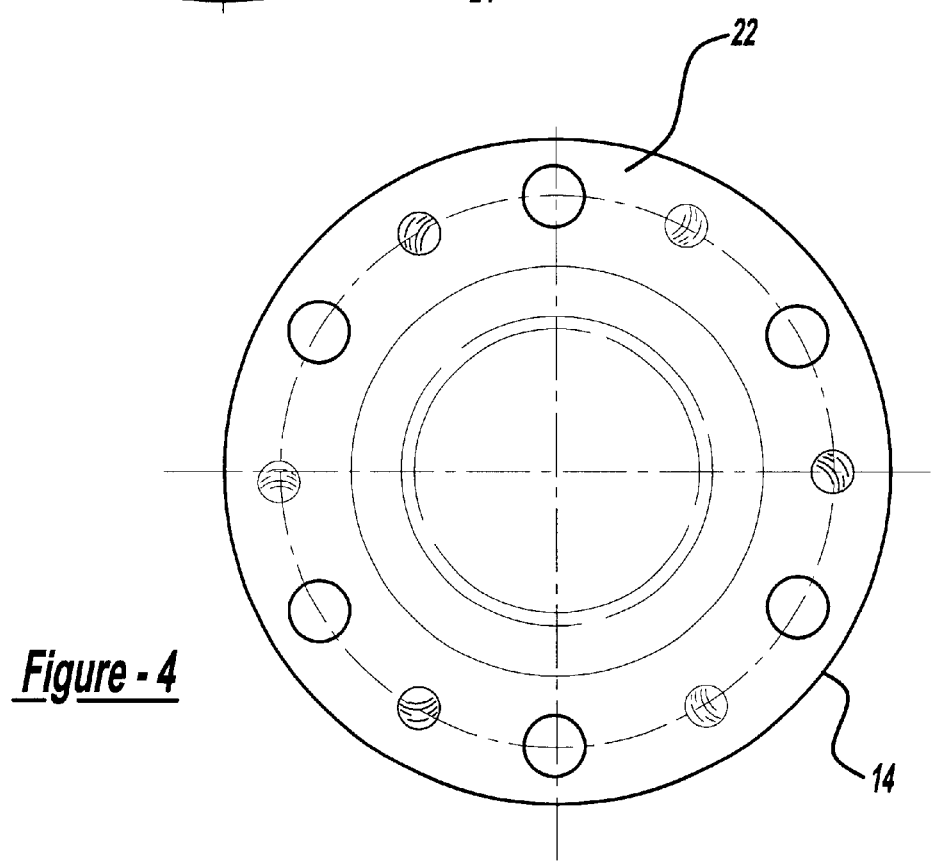
FIG. 4 is a bottom plan view of the improved grease cap of the present invention.
Figure 5:
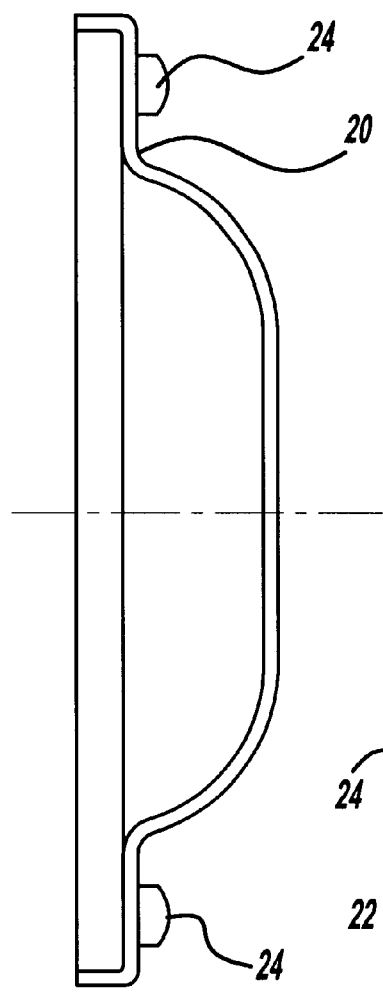
FIG. 5 is a right side elevational view of the improved grease cap of the present invention.
Figure 6:
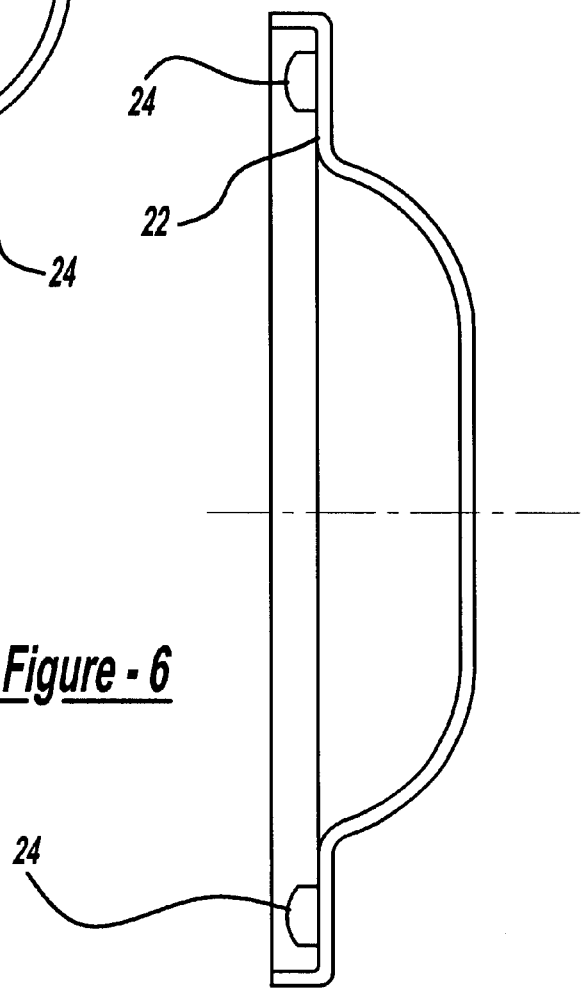
FIG. 6 is a left side elevational view of the improved grease cap of the present invention.
Figure 7:
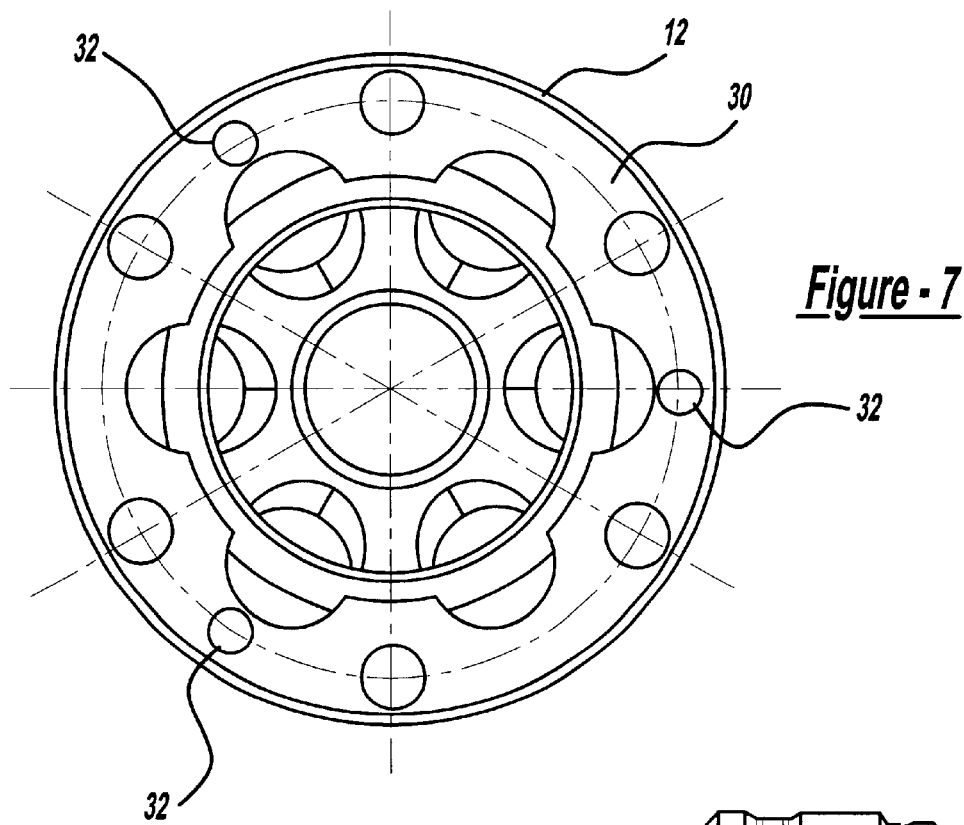
FIG. 7 is a top plan view of the improved constant velocity joint of the present invention.
Figure 8:
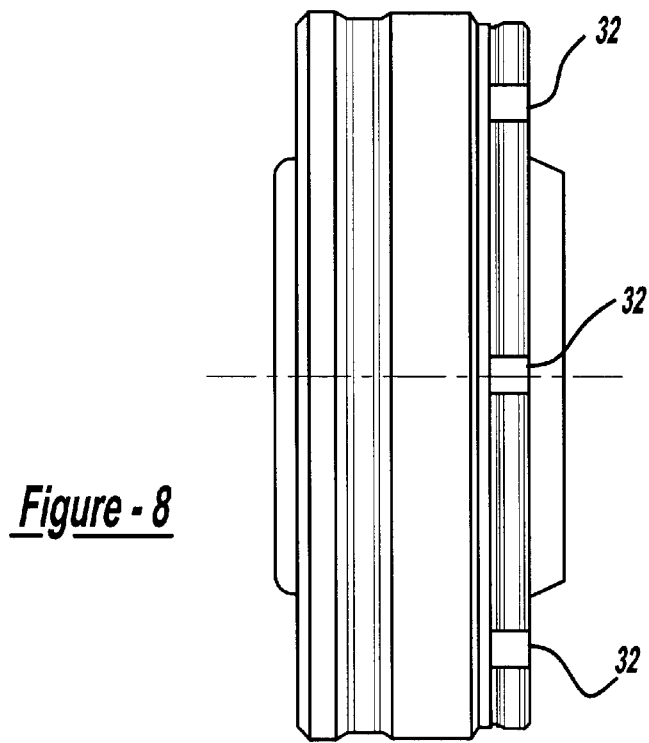
FIG. 8 is a right side elevational view of the constant velocity joint of FIG. 7.
Figure 9:
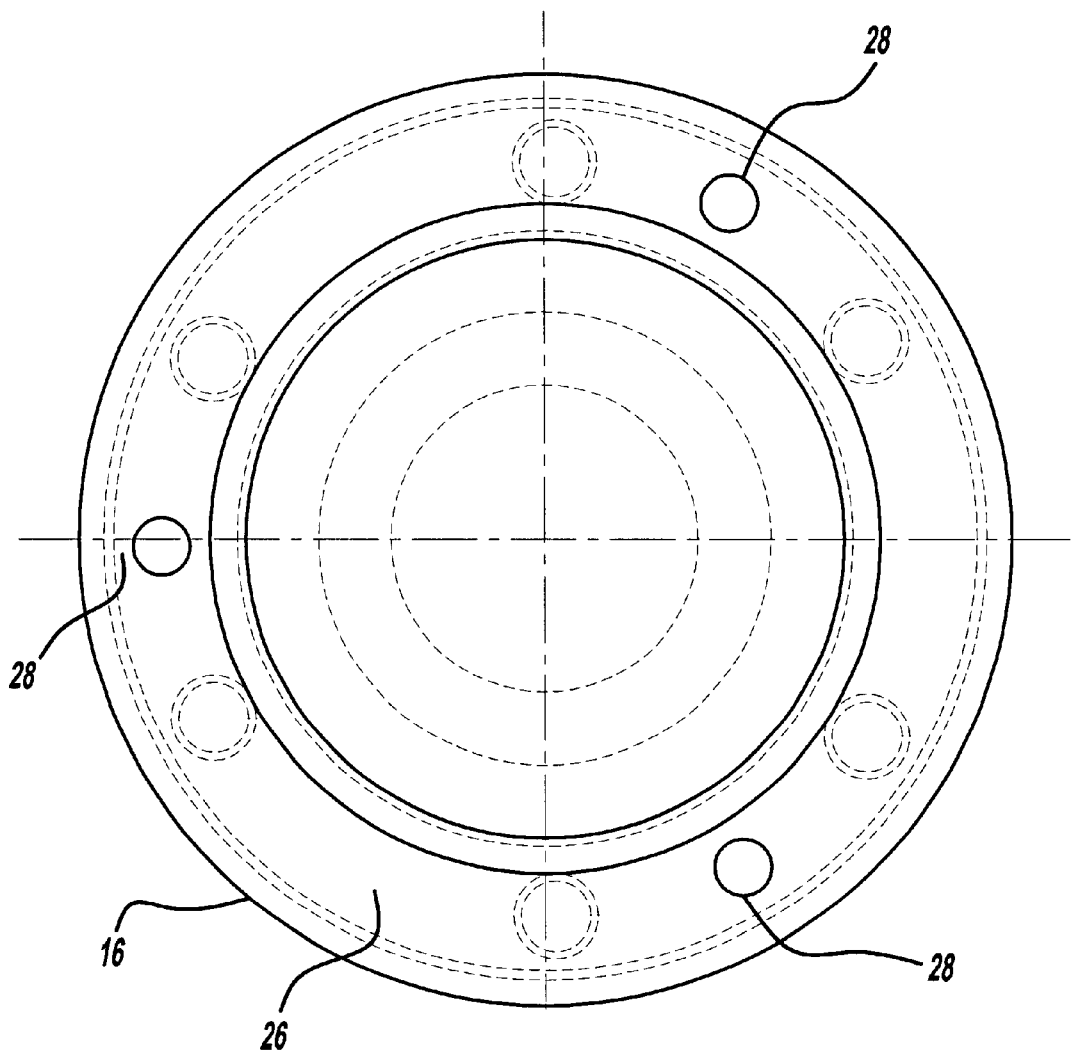
FIG. 9 is a top plan view of the improved flange of the present invention.
Figure 10:
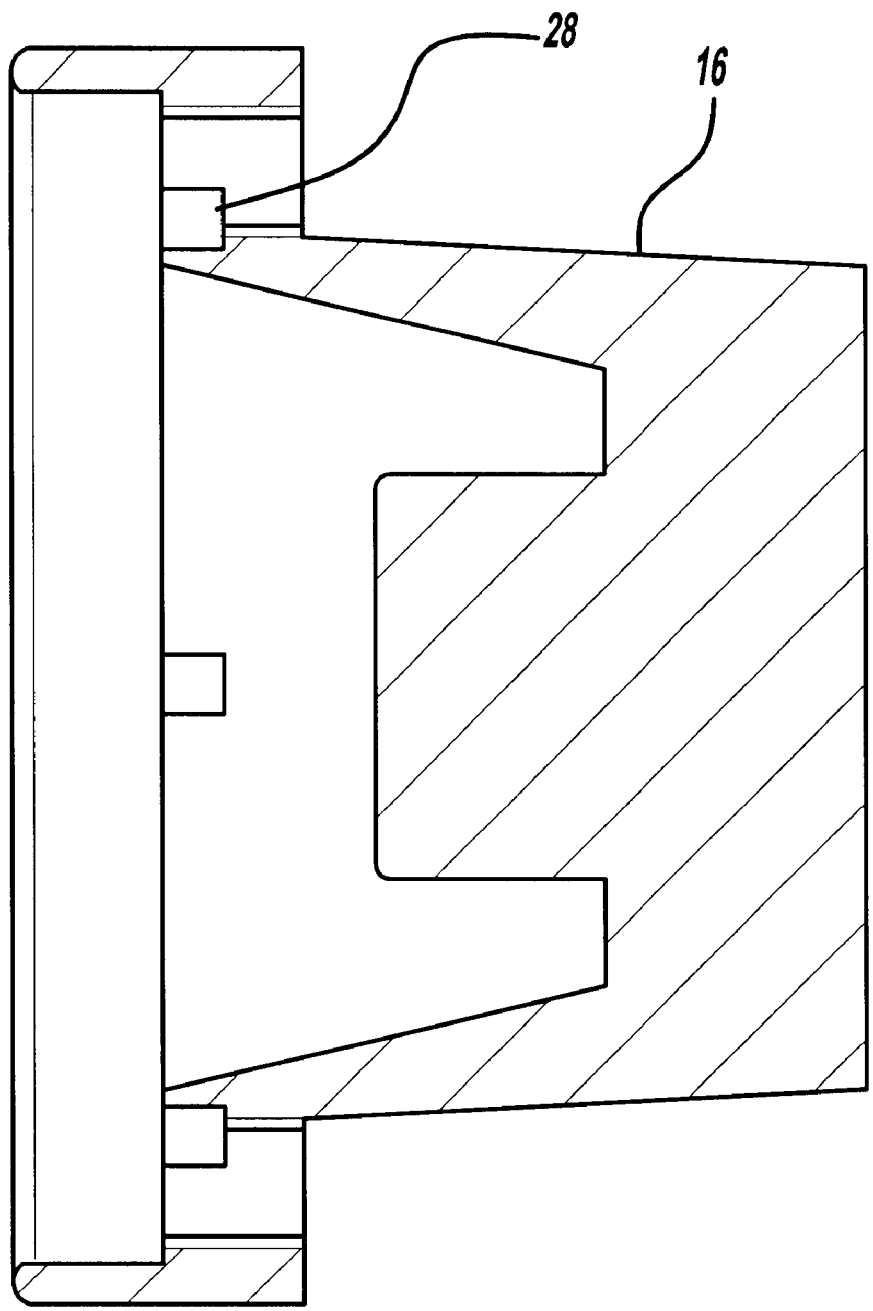
FIG. 10 is a right side elevational view of the flange of FIG. 8.

With Reference to FIG. 1 of the drawings, there is shown a prior art interface generally referred to by reference numeral 10 of a constant velocity joint 12, a grease cap 14, and a mating flange 16 of a propeller shaft (not shown). In this typical interface, a plurality of bolts 18 removably affix the components to one another. It has been found, however, that over time when torque is applied to the propeller shaft, bolts 18 may begin to loosen and, in extreme cases, disengage from the assembly 10.

Referring now to FIGS. 2–8 of the drawings, the invention described herein overcomes the aforementioned problem by providing anti-slipping means between and among the mating surfaces of the respective components. More specifically, each of the mating surfaces is provided with one or more anti-slip portions which are preferably, but not necessarily, radially extending dimples and/or radially disposed recesses operative to receive and mate with one another.

In the preferred embodiment shown in FIGS. 2–8, for example, grease cap 14 includes first and second mating surfaces 20 and 22 respectively. Mating surface 20 is provided with a plurality of circumferentially distributed dimples 24 extending radially and therefrom. Similarly, opposing surface 22 is provided with a plurality of circumferentially distributed dimples 24 which also extend radially therefrom. In keeping with the invention, mating surface 26 of flange 16 is further provided with a plurality of circumferentially distributed recesses 28 which are adapted to receive and mate with surface 20 and dimples 24 of grease cap (also called a grease cover) 14. Still further, constant velocity joint 12 includes a mating surface 30 having a plurality of circumferentially distributed recesses 32. Again, in keeping with the invention, mating surface 30 and recesses 32 are adapted to receive and mate with mating surface 20 of grease cap 14 and the corresponding dimples 24.

Respective dimples 24 and recesses 28 and 32 of the above described components function to retain the constant velocity joint 12, grease cap 14, and flange 16, and, more particularly, to reduce shearing forces resulting from applied torque to the propellor shaft which could cause bolts 18 to loosen or disengage.

In the preferred embodiment described herein, grease cap 14 includes a plurality of dimples 24 on mating surfaces 20 and 22, and constant velocity joint 12 and flange 16 are provided with corresponding recesses 28 and 32. However, any suitable combination of anti-slip means may be used provided that the objects of the invention are achieved. Thus, for example, grease cap 14 may be provided with one or more recesses on its mating surfaces 20 and 22, and constant velocity joint 12 and flange 16 may be provided with corresponding dimples adapted to receive and be retained therein. Still further, the components may include both dimples and/or recesses on the same mating surface and/or opposing surfaces. For example, surface 22 of grease cover 14 may include dimples while surface 20 of grease cover 14 may include recesses. Yet still further, surfaces 20 or 22 may include both dimples and/or recesses provided that the corresponding anti-slip portion is appropriate. That is, dimples must mate with recesses and vice versa.

In the preferred embodiment disclosed herein, dimples 24 and recesses 28 and 32 are circumferentially disposed and evenly distributed about a common access. It is understood, however, that any suitable arrangement and location may be used provided only that the result of reducing or limiting slip is provided. Dimples 24 and recesses 28 and 32 may also take any suitable physical form or geometry. In the preferred embodiment, dimples 24 are raised portions with substantially rounded ends and recesses 28 and 32 are substantially circular counter bores adapted to receive and mate with dimples 24. However, any suitable physical or geometric form may be used including, without limitation, triangular, square, rectangular, etc. Dimples 24 and/or recesses 28 or 32 may also be further modified so as to not merely be received but to further lock together once mated. Thus, for example, dimples 24 may be slightly larger in size to substantially lock with the corresponding receiving recess 28 or 32. Still further, while it is contemplated that in a preferred embodiment the respective dimples and recesses will be comprised of the same material and be contiguous with their corresponding parts, it is understood that any composition may in fact be utilized. Thus, dimples 24 for example, could comprise rubber, plastic etc. affixable to their respective parts by a suitable resin or adhesive. It is also understood that any suitable receiving means may be used including, but not limited to a recess. For example, in place of recesses, dimples or other suitable anti-slip means may be received by an outwardly extending locking mechanism such as, for example, a snap or equivalent retaining means.

While the above described embodiment is directed to the interface between a constant velocity joint, grease cap and flange, it is also understood that the anti-slip means and arrangements disclosed herein may be applicable to other components including, without limitation, other driveline system components.

Turning now to FIG. 11 of the drawings, there is shown a block diagram of the method steps of the present invention. As shown, the method includes providing 40 a constant velocity joint having a first mating surface with a first anti slip portion. The method further comprises providing 42 a flange having a mating surface and a second anti-slip portion. Still further, the method comprises providing 44 a grease cover having a first mating surface with a third anti-slip portion adapted to receive and mate with the first anti slip portion of the constant velocity joint and a second mating surface having a fourth anti-slip portion adapted to receive and mate with the second anti slip portion of the flange.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An improved constant velocity joint, grease cover and flange assembly, comprising:
   a constant velocity joint having a mating surface with a first anti-slip portion;
   a flange having a mating surface with a second anti-slip portion;
   a grease cover having a first mating surface with a third anti-slip portion adapted to receive and mate with the first anti-slip portion of the constant velocity joint, and a second mating surface with a fourth anti-slip portion adapted to receive and mate with the second anti-slip portion of the flange;

wherein the respective anti-slip portions function to reduce shearing forces on connecting bolts of the assembly caused by applied torque.

2. An assembly as in claim 1, wherein the first anti-slip portion comprises a plurality of recesses.

3. An assembly as in claim 1, wherein the second anti-slip portion comprises a plurality of recesses.

4. An assembly as in claim 1, wherein the third anti-slip portion comprises a plurality of dimples.

5. An assembly as in claim 1, wherein the fourth anti-slip portion comprises a plurality of dimples.

6. An improved constant velocity joint, grease cover and flange assembly, comprising:

a grease cover having a first surface with a first plurality of circumferentially distributed dimples extending radially therefrom, and a second opposing surface with a second plurality of circumferentially distributed dimples extending radially therefrom;

a flange having a mating surface with a plurality of circumferentially distributed recesses, the flange mating surface and recesses adapted to receive and mate with the respective first surface and first plurality of dimples of the grease cover; and a constant velocity joint having a mating surface with a plurality of circumferentially distributed recesses, the constant velocity joint mating surface and recesses adapted to receive and mate with the respective second surface and second plurality of dimples of the grease cover;

wherein the respective dimples of the grease cover and recesses of the flange and constant velocity joint function to provide an improved interface to reduce shearing forces on connecting bolts of the assembly caused by applied torque.

7. An assembly as in claim 6, wherein the dimples are integrally molded in the grease cover.

8. An assembly as in claim 6, wherein the dimples are substantially rounded.

9. An improved constant velocity joint, grease cover and flange assembly, comprising:

a grease cover having a first surface with a first plurality of circumferentially distributed recesses, and a second opposing surface with a second plurality of circumferentially recesses;

a flange having a mating surface with a plurality of circumferentially distributed dimples extending radially therefrom, the flange mating surface and dimples adapted to receive and mate with the respective first surface and first plurality of recesses of the grease cover; and a constant velocity joint having a mating surface with a plurality of circumferentially distributed dimples extending radially therefrom, the constant velocity joint mating surface and dimples adapted to receive and mate with the respective second surface and second plurality of recesses of the grease cover;

wherein the respective recesses of the grease cover and dimples of the flange and constant velocity joint function to provide an improved interface to reduce shearing forces on connecting bolts of the assembly caused by applied torque.

10. An improved constant velocity joint, grease cover and flange assembly, comprising:

a grease cover having a first surface with a plurality of circumferentially distributed dimples extending radially therefrom, and a second opposing surface with a plurality of circumferentially distributed recesses;

a flange having a mating surface with a plurality of circumferentially distributed recesses, the flange mating surface and recesses adapted to receive and mate with the respective first surface and plurality of dimples of the grease cover; and a constant velocity joint having a mating surface with a plurality of circumferentially distributed dimples extending radially therefrom, the constant velocity joint mating surface and dimples adapted to receive and mate with the respective second surface and plurality of recesses of the grease cover;

wherein the respective dimples and recesses of the grease cover, flange and constant velocity joint function to provide an improved interface to reduce shearing forces on connecting bolts of the assembly caused by applied torque.

11. A method of providing an improved constant velocity joint, grease cap and flange interface, comprising:

providing a constant velocity joint having a first mating surface with a first anti-slip portion;

providing a flange having a mating surface and a second anti-slip portion; and providing a grease cap having a first mating surface with a third anti slip portion adapted to receive and mate with the first anti slip portion of the constant velocity joint, and a second mating surface having a fourth anti slip portion adapted to receive and mate with the second anti slip portion of the flange.

12. A method as in claim 11, wherein the first anti-slip portion comprises a plurality of recesses.

13. A method as is in claim 11, wherein the second anti-slip portion comprises a plurality of recesses.

14. A method as in claim 11, wherein the third anti-slip portion comprises a plurality of dimples.

15. A method as in claim 11, wherein the fourth anti-slip portion comprises a plurality of dimples.

16. A method of providing an improved constant velocity joint, grease cap and a flange assembly, comprising providing a grease cap having a first surface with a first plurality of circumferentially distributed dimples extending radially therefrom, and a second opposing surface with a second plurality of circumferentially distributed dimples extending radially either from radially;

providing a flange having a mating surface with a plurality of circumferentially distributed recesses, the flange mating surface and recesses adapted to receive and mate with the respective first surface and first plurality of dimples of the grease cover; and providing a constant velocity joint having a mating surface with a plurality of circumferentially distributed recesses, the constant velocity joint mating surface and recesses adapted to receive and mate with the respective second surface and second plurality of dimples of the grease cover;

wherein the respective dimples of the grease cover and recesses of the flange and constant velocity joint function to provide an improved interface to reduce shearing forces of connecting volts of the assembly caused by applied torque.

* * * * *